(12) United States Patent
Park et al.

(10) Patent No.: US 9,985,487 B2
(45) Date of Patent: May 29, 2018

(54) ROTOR FOR MOTOR, MOTOR HAVING THE SAME AND METHOD FOR MANUFACTURING THE MOTOR

(71) Applicant: LG INNOTEK CO., LTD., Seoul (KR)

(72) Inventors: Kyung Sang Park, Seoul (KR); Seong Jin Kim, Seoul (KR); Jin Ho Kim, Seoul (KR); Chang Hyun Park, Seoul (KR); Woo Seob Shim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 668 days.

(21) Appl. No.: 14/602,428

(22) Filed: Jan. 22, 2015

(65) Prior Publication Data

US 2015/0207372 A1    Jul. 23, 2015

(30) Foreign Application Priority Data

Jan. 23, 2014    (KR) .................. 10-2014-0008353

(51) Int. Cl.
| | |
|---|---|
| H02K 1/28 | (2006.01) |
| H02K 1/27 | (2006.01) |
| H02K 1/04 | (2006.01) |
| H02K 15/02 | (2006.01) |
| H02K 1/30 | (2006.01) |

(52) U.S. Cl.
CPC ................ *H02K 1/28* (2013.01); *H02K 1/04* (2013.01); *H02K 1/274* (2013.01); *H02K 1/30* (2013.01); *H02K 15/02* (2013.01); *Y10T 29/49012* (2015.01)

(58) Field of Classification Search
CPC ......... H02K 7/116; H02K 7/063; H02K 15/03

USPC ................................... 310/61, 60 A
See application file for complete search history.

(56) References Cited

U.S. PATENT DOCUMENTS

| 5,237,737 A | 8/1993 | Zigler et al. |
| 7,750,515 B1 * | 7/2010 | Gabrys .................... H02K 9/08 310/266 |
| 8,841,814 B2 * | 9/2014 | Arimatsu ................. H02K 1/30 310/216.119 |
| 2003/0146667 A1 * | 8/2003 | Hattori ..................... H02K 1/32 310/61 |

(Continued)

FOREIGN PATENT DOCUMENTS

| GB | 2 217 924 | 11/1989 |
| KR | 10-2008-0095647 A | 10/2008 |

(Continued)

OTHER PUBLICATIONS

Korean Office Action dated Jun. 16, 2015 issued in Application No. 10-2014-0008353.

(Continued)

*Primary Examiner* — Naishadh Desai
(74) *Attorney, Agent, or Firm* — KED & Associates, LLP

(57) ABSTRACT

Disclosed herein is a rotor for motor including a rotor tube disposed inside a stator, a rotor core that is formed on a circumferential surface of the rotor tube and integrally formed with the rotor tube, and magnets coupled to the rotor core. The rotor for motor provides an advantageous effect of preventing the deformation of the rotor tube in the process of assembling the rotor tube and the rotor core.

8 Claims, 4 Drawing Sheets

(56) References Cited

U.S. PATENT DOCUMENTS

| | | | |
|---|---|---|---|
| 2006/0255894 A1* | 11/2006 | Enomoto | H02K 1/278 335/302 |
| 2010/0052457 A1* | 3/2010 | Brahmavar | H02K 1/2733 310/156.13 |
| 2014/0167540 A1* | 6/2014 | Kim | H02K 7/116 310/80 |

FOREIGN PATENT DOCUMENTS

| | | |
|---|---|---|
| KR | 10-2012-0058817 A | 6/2012 |
| KR | 10-2014-0007098 A | 1/2014 |
| WO | WO 98/37611 | 8/1998 |

OTHER PUBLICATIONS

European Search Report dated Jun. 10, 2016 issued in Application No. 15152364.4.

\* cited by examiner

ROTOR FOR MOTOR, MOTOR HAVING THE SAME AND METHOD FOR MANUFACTURING THE MOTOR

CROSS-REFERENCE TO RELATED APPLICATION

This application claims priority under 35 U.S.C. § 119 to Korean Application No. 10-2014-0008353 filed on Jan. 23, 2014, whose entire disclosure is incorporated herein by reference.

BACKGROUND

1. Field

Embodiments of the present application relate to a rotor for a motor, a motor having the same and a method for manufacturing the same and, more specifically, to a rotor for a motor having a rotor tube, a motor having the same and a method for manufacturing the same.

2. Background

Motors are devices that convert electric energy to rotational energy using a force applied to a conductor in a magnetic field. Recently, as applications of the motors increase, functions of the motors become important. Particularly, with rapid electronization of automobiles, a demand for the motors applied to a steering system, a braking system and a design system, etc. is increased dramatically.

Conventionally, the motors are provided with a shaft formed to be rotatable, a rotor coupled with the shaft, and a stator fixed inside a housing, wherein the stator is installed along a circumference of the rotor with a gap. A coil forming a rotational magnetic field is wound around the stator so as to induce an electric interaction with the rotor to rotate the rotor. When the rotor is rotated, the shaft is rotated to create or assist a braking force or a steering force.

Here, the rotor may be provided with a rotor tube in a tubular form, a rotor core coupled to a circumferential surface of the rotor tube, and magnets. The shaft may be press-fitted into the rotor tube. The rotor core may be press-fitted around the circumferential surface of the rotor tube.

Meanwhile, the rotor tube may be easily deformed while the rotor core is coupled to the rotor tube, because the rotor tube is thin. When the deformation of the rotor tube occurs, inner and outer diameters of the rotor tube may be changed so that a quality of the motor may become an issue. In addition, there is a problem that chips may occur while the rotor core is press-fitted around the rotor tube.

In addition, a slip may occur between the rotor tube and the rotor core when the motor rotates at a high speed. When the slip is sustained, a problem of separation of the rotor core from the rotor tube may occur.

BRIEF DESCRIPTION OF THE DRAWINGS

The embodiments will be described in detail with reference to the following drawings in which like reference numerals refer to like elements wherein.

DETAILED DESCRIPTION

Hereafter, exemplary embodiments of the present application will be described in detail with reference to the accompanying drawings. These and other objects, advantages and features of the invention will become apparent from the following more detailed description taken in conjunction with the accompanying drawings. The terms or words used in the specification and claims are not to be interpreted by their typical or dictionary meanings but their meanings and concepts should be construed in conformity with the technical idea of the invention, based on the principle that the inventor can properly define the concepts of the terms so as to explain the invention in the best manner. Detailed descriptions of well-known functions and structures incorporated herein may be omitted to avoid obscuring the subject matter of the present application.

Figure 1:
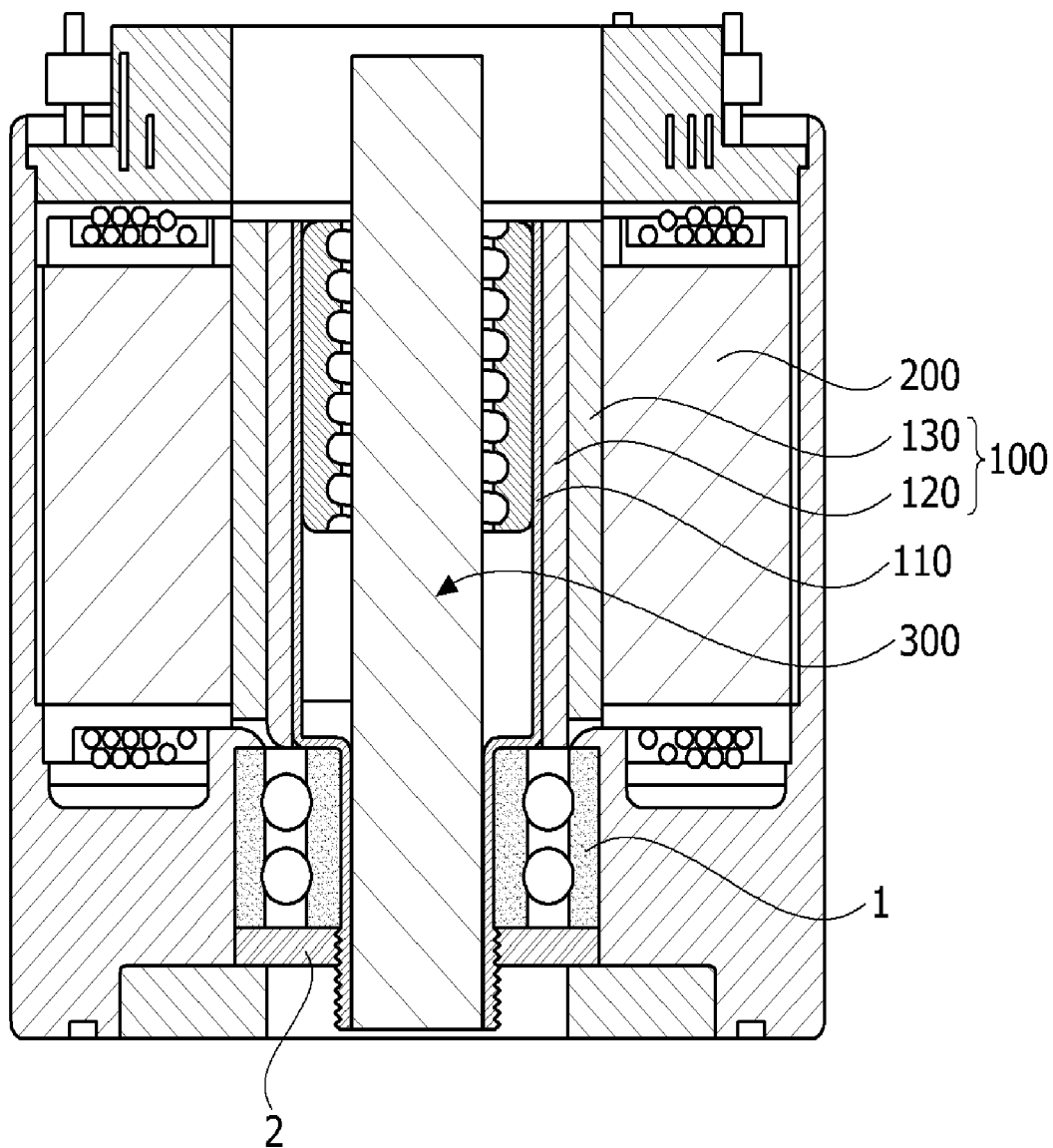
FIG. 1 is a view illustrating a motor according to a preferred embodiment of the present application.
Figure 2:
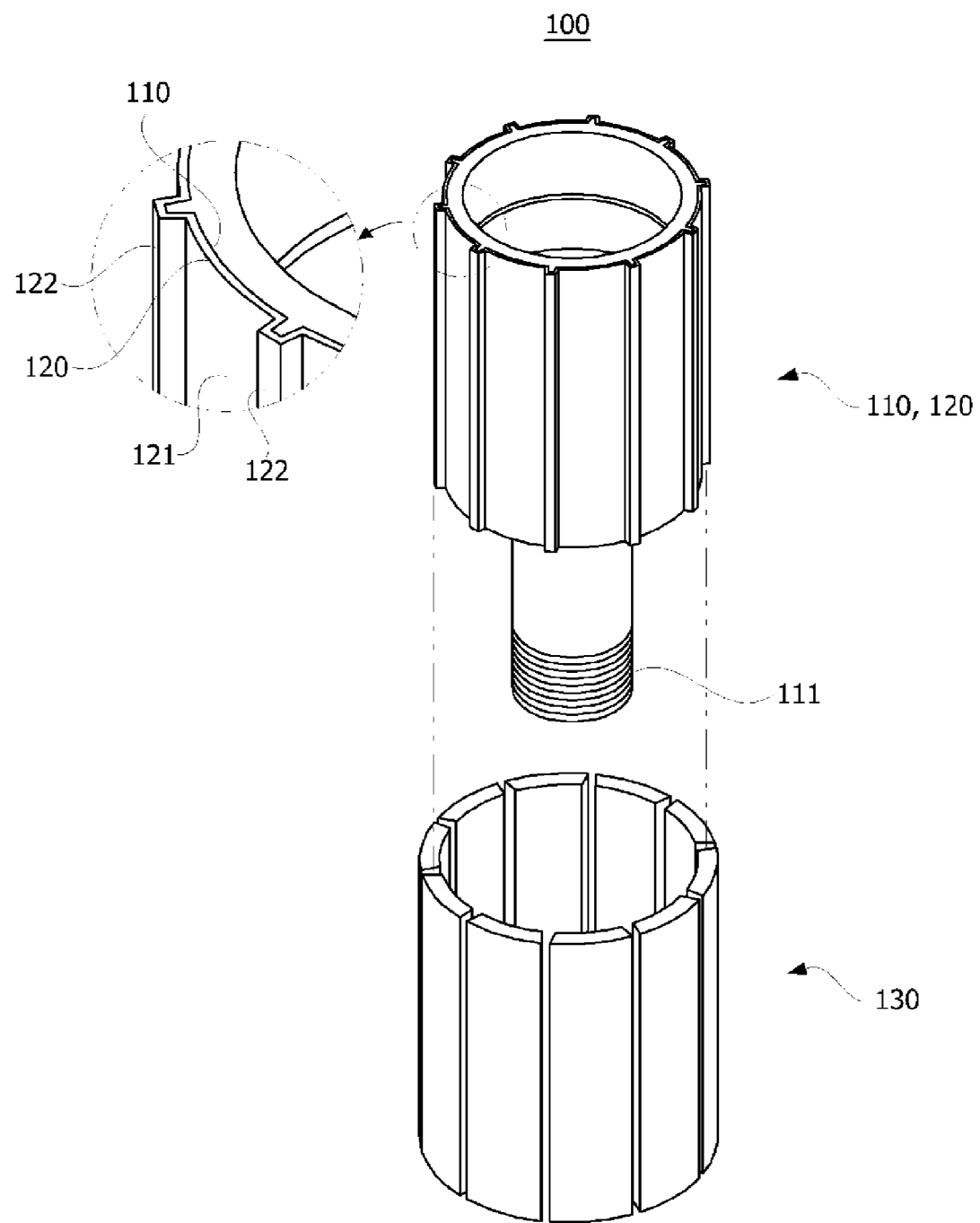
FIG. 2 is a view illustrating a rotor tube and a rotor core integrally formed with each other.

FIG. 1 is a view illustrating a motor according to a preferred embodiment of the present application, and FIG. 2 is a view illustrating a rotor tube and a rotor core integrally formed with each other. FIGS. 1 and 2 are to clearly illustrate only principal features to help conceptual understating of the present application. As a result, the illustrations are expected to be variously modified, and the scope of the present application is not necessarily limited to a specific shape illustrated in the figures.

First, referring to FIG. 1, a motor 10 according to a preferred embodiment of the present application may include a rotor 100, a stator 200 and a shaft 300.

The rotor 100 may include a rotor tube 110, a rotor core 120, and magnets 130. The rotor tube 110 may be disposed inside the stator 200, and the rotor core 120 may be formed on a circumference surface of the rotor tube 110. The shaft 300 may be coupled inside of the rotor tube 110 in a press-fitting way. A fixing block having threads formed on inner side thereof may be press-fitted into the rotor tube 110, and the shaft 300 may be screwed to the fixing block. A bearing 1 may be coupled to a circumference surface of a lower portion of the rotor tube 110. The bearing 1 serves to rotationally support the rotor tube 110 and supporting an axial load. A washer 2 supporting the bearing 1 under the bearing 1 may be screwed to the shaft 300. A threaded end 111 may be formed on an end portion of the shaft 300 to be screwed with the washer 2.

Referring to FIG. 2, the rotor tube 110 and the rotor core 120 may be integrally formed with each other. The rotor tube 110 and the rotor core 120 may be formed by any one of forging, sintering and pressing processing processes. Herein, the forging process means a process of applying a static or dynamic pressure during a smooth plastic flow to refine crystal grains, homogenizing a structure, and simultaneously forming into a predetermined shape. The sintering process means a process of sintering a powder compact formed under pressure, and the pressing process means plastic working using a press.

Since the rotor tube 110 and the rotor core 120 is integrally formed, deformation occurring in the process of assembling the rotor tube 110 and the rotor core 120 can be fundamentally prevented. Further, chips can be prevented from occurring, because the press-fitting process is not required. In addition, it is possible to prevent a slip from occurring between the rotor tube 110 and the rotor core 120.

A plurality of slots 121 may be divided and formed in a circumference of the rotor core 120. The slots 121 may be formed between protrusions 122. A plurality of protrusions 122 may be formed to protrude from the circumference surface of the rotor core 120, formed in an elongated form in a longitudinal direction, and disposed spaced apart from each other along the circumference of the rotor core 120.

The rotor tube 110 may be formed in the shape of a cylinder in which the shaft 120 can be mounted. The rotor tube 110 may be reduced in diameter in a stepwise manner as it goes down in a longitudinal direction thereof so that a plurality of step regions can be formed. This is for supporting an axial load through a raised portion formed between the step regions. The rotor core 120 may be integrally formed with any one of the step regions.

Figure 3:
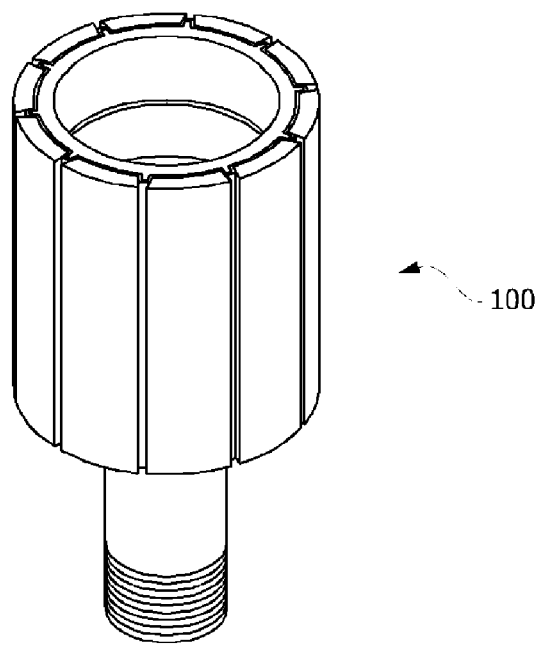
FIG. 3 is a view illustrating magnets attached to the rotor core.

FIG. 3 is a view illustrating magnets attached to the rotor core.

As illustrated in FIGS. 2 and 3, magnets 130 are coupled into the respective slots 121. The magnets 130 are formed in the shape of a plate whose thickness direction is set to a radial direction of the rotor core 120. The magnets 130 may be coupled into the slots 121 by an adhesive.

Figure 4:
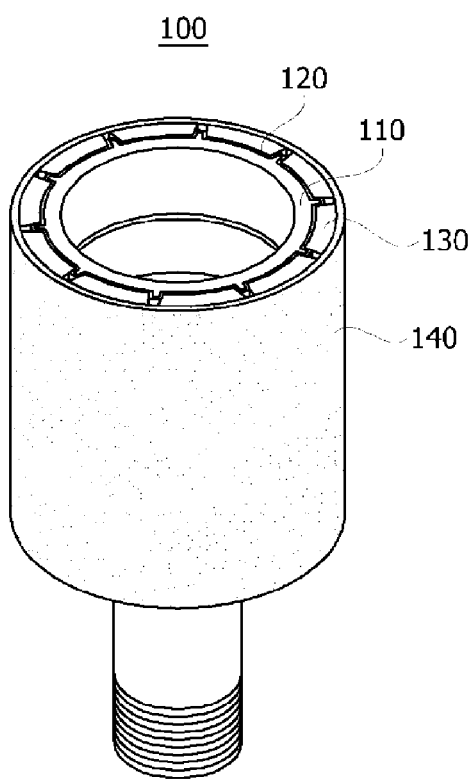
FIG. 4 is a view illustrating a molded state of the rotor core and the magnets.

FIG. 4 is a view illustrating a molded state of the rotor core and the magnets.

Referring to FIG. 4, a mold 140 may couple the rotor tube 110 and the rotor core 120. The mold 140 is formed to surround the circumference of the rotor core 120. The mold 140 may be formed to surround the entire circumference of the rotor core 120 as illustrated in FIG. 4, but present application is not limited thereto. The mold 140 may be formed only on a partial region of the rotor core 120. When the thicknesses of the magnets 130 are greater or smaller than the thicknesses of the protrusions 122, a space may be formed between the magnets 130 or the protrusions 122, and may be filled with the mold 140. In this case, the mold has a non-uniform thickness. In addition, when the magnets 130 and the protrusions 122 have the same thickness, the mold 140 may surround the circumferential portion of the rotor core 120 at a substantially uniform thickness.

Although the mold 140 surrounds a lateral portion of the rotor core 120 in FIG. 4, present application is not limited thereto, and the mold 140 may cover an upper surface portion of the rotor core 120. In this case, not only radial separation but also axial separation or movement of the magnets 130 can be prevented.

Figure 5:
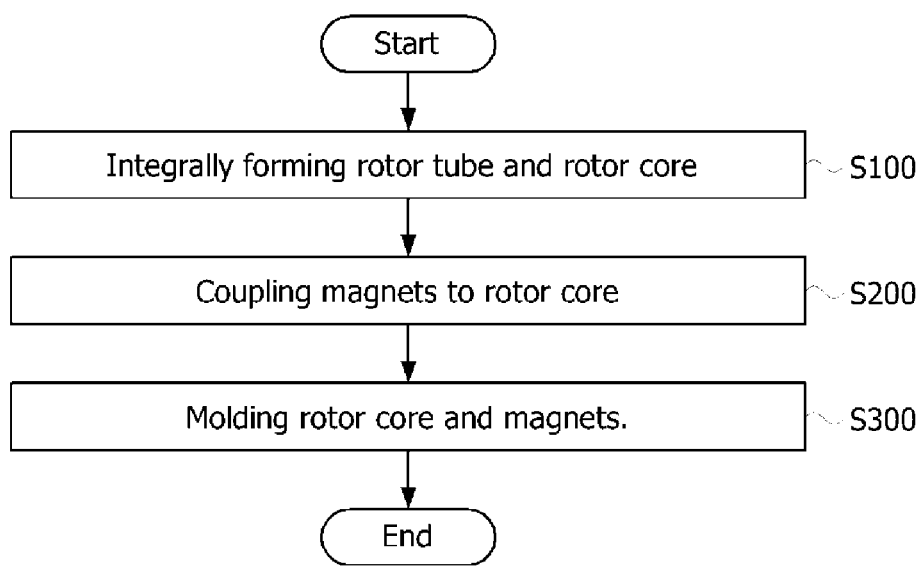
FIG. 5 is a flow chart describing a method for manufacturing a motor according to another preferred embodiment of the present application.

FIG. 5 is a flow chart describing a method for manufacturing a motor according to another preferred embodiment of the present application.

Referring FIGS. 2 to 5, in the method for manufacturing the motor according to another preferred embodiment of the present application, the rotor tube 110 and the rotor core 120 may be integrally formed first (S100).

Then, the magnets 130 may be coupled into the slots 121 of the rotor tube 110 (S200).

Next, the rotor core 120 and the magnets 130 may be fixed by molding (S300).

The rotor for motor, the motor having the same and the method for manufacturing the rotor according to the preferred embodiments of the present application have been described above in detail with reference to the attached drawings.

Accordingly, the present application has been made keeping in mind that above problems occurring in the prior art, and an object of the present application is to provide a rotor for a motor, a motor having the rotor, and a method for manufacturing the rotor, capable of preventing a rotor tube from being deformed in the process of assembling the rotor.

In addition, another object of the present application is to provide a rotor for a motor, a motor having the rotor, and a method for manufacturing the rotor, capable of preventing chips from occurring in the process of assembling the rotor.

Further, yet another object of the present application is to provide a rotor for a motor, a motor having the rotor, and a method for manufacturing the rotor, capable of preventing a slip from occurring between a rotor tube and a rotor core.

Objects of the present application should not be construed as limited to the objects described above, and other objects not described herein will be readily understood by a person skilled in the art upon consideration of the following detailed description of the invention.

To achieve the objects described above, according to an aspect of the present application, there is provided a rotor for a motor, which includes: a rotor tube having at least two step regions whose diameters are different from each other; a rotor core disposed on a circumferential surface of the rotor tube and integrally formed with the rotor tube; and magnets disposed on the circumferential surface of the rotor core.

Preferentially, the rotor tube and the rotor core may be integrally formed by any one of forging, sintering and pressing processes.

Preferentially, a plurality of discrete slots may be formed in a circumference of the rotor core, and the magnets may be coupled to the respective slots.

Preferentially, the slots may be formed between a plurality of protrusions that are formed to protrude from the circumference surface of the rotor core in an elongated form in a longitudinal direction and disposed spaced apart from each other along a circumference of the rotor core.

Preferentially, the magnets may be formed in a plate shape whose thickness direction is set to a radial direction of the rotor core.

Preferentially, the rotor may further include a mold surrounding the rotor core.

Preferentially, the at least two step regions may be reduced in diameter toward bottoms thereof.

According to another aspect of the present application, there is provided a motor that includes: a stator; a rotor including a rotor tube that is disposed within the stator and has at least two step regions whose diameters are different from each other, a rotor core that is formed on a circumferential surface of the rotor tube and integrally formed with the rotor tube, and magnets coupled to the rotor core; and a shaft coupled inside the rotor tube.

Preferentially, the rotor tube and the rotor core may be formed by any one of forging, sintering and pressing processes.

Preferentially, a plurality of slots may be divided and formed on a circumference of the rotor core, and the magnets may be coupled into the respective slots.

Preferentially, the slots may be formed between a plurality of protrusions that are formed to protrude from the circumference surface of the rotor core in an elongated form in a longitudinal direction and are disposed spaced apart from each other along the circumference of the rotor core.

Preferentially, the magnets may be formed in a plate shape whose thickness direction is set to a radial direction of the rotor core.

Preferentially, the motor may further include a mold surrounding the rotor core.

Preferentially, the at least two step regions may be reduced in diameter toward bottoms thereof.

According to yet another aspect of the present application, there is provided a method for manufacturing a rotor including: integrally forming a rotor tube and a rotor core; coupling magnets to the rotor core; and molding the rotor core and the magnets.

According to embodiments of the present application, there is provided an advantageous effect of preventing the rotor tube from being deformed in the process of assembling the rotor tube and the rotor core by integrally forming the rotor tube and the rotor core.

In addition, according to an embodiment of the present application, there is provided another advantageous effect of preventing chips from being formed by integrally shaping the rotor tube and the rotor core.

Further, according to an embodiment of the present application, there is provided yet another advantageous effect of preventing a slip from occurring between the rotor tube and the rotor core and of saving a manufacturing cost by replacing two parts with one part.

The above description of the present disclosure is provided for the purpose of illustration, and it would be understood by those skilled in the art that various modifications, changes and substitutions may be made without changing technical conception and essential features of the present disclosure. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor comprising:
   a stator;
   a rotor including a rotor tube, a rotor core and magnets characterized in that the rotor tube has at least two step regions arranged in a stepwise manner along a longitudinal direction thereof, and diameters of the at least two step regions of the rotor tube are different from each other, and the rotor core is disposed on an outer circumferential surface of a larger diameter region of the two step regions of the rotor tube;
   the magnet is disposed on the circumferential surface of the rotor core,
   the rotor core is integrally formed with the rotor tube, and
   a bearing is disposed on an outer circumferential surface of a smaller diameter region of the two step regions of the rotor tube.

2. The motor of claim 1, wherein the rotor tube and the rotor core are formed by any one of forging, sintering and pressing processes,
   the motor further comprising a block having threads formed on inner side thereof to be press-fitted into the rotor tube, and a shaft be screwed to the fixing block.

3. The motor of claim 1, wherein a plurality of slots are provided on a circumference of the rotor core, and the magnets are coupled into the respective slots,
   the motor further comprising:
      a washer supporting the bearing, the washer provided under the bearing, and
      a threaded end provided at an end portion of a shaft to be screwed to the washer.

4. The motor of claim 3, wherein the slots are formed between a plurality of protrusions that are formed to protrude from the circumference of the rotor core in an elongated form in a longitudinal direction and are disposed to be spaced apart from each other along the circumference of the rotor core.

5. The motor of claim 3, wherein the magnets are formed in a plate shape, a thickness direction of which is set to a radial direction of the rotor core,
   the motor further comprising a mold surrounding the rotor core, and the mold to cover an upper surface portion of the rotor core.

6. The motor of claim 1, further comprising a mold surrounding the rotor core, and the mold has a non-uniform thickness.

7. The motor of claim 1, wherein the at least two step regions are reduced in diameter toward bottoms thereof.

8. A method for manufacturing a rotor comprising:
   integrally forming a rotor tube and a rotor core;
   coupling magnets to the rotor core; and
   molding the rotor core and the magnets, wherein the rotor tube has at least two step regions each of which is arranged in a stepwise manner along a longitudinal direction thereof, and diameters of the at least two step regions of the rotor tube are different from each other, and the rotor core is disposed on an outer circumferential surface of a larger diameter region of the two step regions of the rotor tube, and the magnet is disposed on the circumferential surface of the rotor core, and a bearing is disposed on an outer circumferential surface of a smaller diameter region of the two step regions of the rotor tube.

* * * * *